United States Patent [19]

Epstein et al.

[11] Patent Number: 5,895,771
[45] Date of Patent: Apr. 20, 1999

[54] FLUORINATED ALKOXY AND/OR ARYLOXY ALUMINATES AS COCATALYSTS FOR METALLOCENE-CATALYZED OLEFIN POLYMERIZATIONS

[75] Inventors: Ronald A. Epstein, Upper Montclair, N.J.; Thomas J. Barbarich, Fort Collins, Colo.

[73] Assignee: Akzo Nobel NV, Arnhem, Netherlands

[21] Appl. No.: 08/870,354

[22] Filed: Jun. 5, 1997

[51] Int. Cl.$^6$ .............. B01J 31/00; B01J 37/00; C08F 4/02; C08F 4/60
[52] U.S. Cl. .............. 502/103; 502/117; 502/132; 502/152; 502/154; 556/181; 556/182; 526/170; 526/943
[58] Field of Search .............. 502/103, 117, 502/132, 152, 154; 556/181, 182

[56] References Cited

U.S. PATENT DOCUMENTS

| | | | |
|---|---|---|---|
| 5,122,491 | 6/1992 | Kioka et al. | 502/117 |
| 5,198,401 | 3/1993 | Turner et al. | 502/103 |
| 5,241,025 | 8/1993 | Hlatky et al. | 502/152 |
| 5,387,568 | 2/1995 | Ewen et al. | 502/152 |
| 5,391,661 | 2/1995 | Naganuma et al. | 502/152 |
| 5,407,882 | 4/1995 | Yamada et al. | 502/114 |
| 5,408,017 | 4/1995 | Turner et al. | 502/155 |
| 5,461,128 | 10/1995 | Takeuchi et al. | 502/152 |
| 5,470,927 | 11/1995 | Turner et al. | 502/152 |
| 5,496,960 | 3/1996 | Piers et al. | 556/8 |
| 5,500,398 | 3/1996 | Marks et al. | 502/152 |
| 5,693,261 | 12/1997 | Krzystowczyk et al. | 556/170 |

FOREIGN PATENT DOCUMENTS 573403  12/1993  European Pat. Off. .

OTHER PUBLICATIONS

T.J. Barbarich et al., Organometallics, vol. 15, pp. 3776–3778, Sep. 1996.

*Primary Examiner*—Mark L. Bell
*Assistant Examiner*—J. Pasterozyk
*Attorney, Agent, or Firm*—Richard P. Fennelly

[57] ABSTRACT

Catalyst compositions for the polymerization of an olefin are disclosed which comprise a neutral metallocene and, as the ionizing agent an anionic aluminum-containing complex which is a fluorinated alkoxy and/or aryloxy aluminate. The fluorinated alkoxy aluminate can be of the formula $A^+(Al(OR)_4)^-$, where $A^+$ is a cation capable of reacting with the neutral metallocene to produce a cationic metallocene and a non-reacting neutral species and R is a fluorinated alkyl and/or aryl group, with a representative group for $A^+$ being $(C_6H_5)_3C^+$ and with the representative fluorinated alkoxy aluminates including $[Al(OC(Ph)(CF_3)_2)_4]^-$, where Ph is phenyl, and $[Al(OC(CH_3)(CF_3)_2)_4]^-$.

5 Claims, No Drawings

5,895,771

FLUORINATED ALKOXY AND/OR ARYLOXY ALUMINATES AS COCATALYSTS FOR METALLOCENE-CATALYZED OLEFIN POLYMERIZATIONS

BACKGROUND OF THE INVENTION

Numerous types of cocatalysts for metallocene-catalyzed olefin polymerizations are known. These include various aluminoxanes, and alkyl and aryl boranes and borates. Such cocatalysts function by forming and stabilizing cationic metallocene and related complexes of the early transition metals, e.g., titanium, zirconium, and hafnium.

These cationic metal complexes are very reactive towards electron donating centers. Anionic complexes with alkoxide ligands can provide sites at the alkoxy oxygen atoms for reaction with the metal cationic species and thereby a mechanism for decomposition of the cation-anion complex.

The synthesis of the $Li^+$ derivative of the $[Al(OC(Ph)(CF_3)_2)_4]^-$ complex and its use as a catalyst for 1,4 conjugate additions has been published in Organometallics, 1996, 15, 3776. In these catalytic reactions, it is the $Li^+$ that is the catalytically active species. The $[Al(OC(Ph)(CF_3)_2)_4]^-$ anion is a weakly coordinating anion to the $Li^+$ and imparts hydrocarbon solubility. No other metal species is used.

In a brief survey of the open and patent literature, the present inventors have not come across any specific reference to anionic species with alkoxy ligands, specifically aluminates and borates being used as cocatalysts for olefin polymerization. Generic formulas can encompass the alkoxy aluminates and borates, but all specific examples are for alkyl or aryl aluminates and borates. For example, U.S. Pat. No. 5,407,882 mentions aluminates, but the compounds cited in the description section and in the Examples in this patent document are all aryl and substituted aryl derivatives. In U.S. Pat. Nos. 5,198,401, 5,241,025, 5,408,017, and 5,470,927, generic formulas are given that could be envisioned by hindsight as encompassing the alkoxy aluminates, but specific references to aluminates of any kind are not given. In U.S. Pat. No. 5,241,025, neutral aluminum species of the type $AlR_3$, where R includes alkoxy groups, are described. The function of these complexes is to act as scavengers for impurities in the polymerization reaction medium, not as activator cocatalysts.

DESCRIPTION OF THE INVENTION

The present invention relates to those known catalyst compositions for the polymerization of an olefin which comprise a neutral metallocene and an ionizing agent comprising an anionic aluminum-containing complex. A representative disclosure illustrating this class of catalyst is found in European Patent Publication No. 573,403. The specific improvement to which the current invention pertains is the use of the aforementioned anionic aluminum-containing complex of a fluorinated alkoxy and/or arlyoxy aluminate. A general formula for such an aluminum-containing complex is $A^+[Al(OR)_4]^-$, where at least one R is a fluorine-containing alkoxy group and/or fluorine-containing aryloxy group and $A^+$ is any cation capable of reacting with a neutral metallocene to produce a cationic metallocene and a non-reacting neutral species. In those cases where up to three of the "R" groups are other than a fluorine-containing alkoxy group and/or fluorine-containing aryloxy group, such R group can be selected from those previously described such as alkyl, aryl, unsubstituted alkoxy, and unsubstituted aryloxy.

It has been found in accordance with the present invention, that aluminates containing the aforementioned fluorinated alkoxide or fluorinated aryloxy ligands produce active catalysts for ethylene polymerization.

The neutral metallocene used in the catalyst of the present invention can be of the type described in the aforementioned European patent document as having the formula

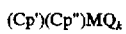

or it can be the analogous half-metallocene of the formula

where, in the foregoing formulae, each of $Cp'$ and $Cp''$ is a cyclopentadienyl or hydrocarbyl-substituted cyclopentadienyl group, M is a Group 4, 5, or 6 metal, Q is a hydride, halogen, or hydrocarbyl radical, and k is from 2 to 3.

The Examples which follow illustrate the application of these complexes as cocatalysts for olefin polymerizations.

ABBREVIATIONS

The following abbreviations are used in the Examples which follow (with Ph=phenyl; and Cp=cyclopentadienyl:

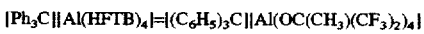

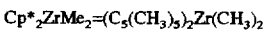

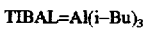

EXAMPLE 1

In this Example, 0.512 g of a 9.78 µmoles/g toluene solution of $Cp*_2ZrMe_2$ (5.0 µmoles) was added to a glass serum vial equipped with a magnetic stirring bar. Then, 31.8 g of toluene and 1.509 g of a 3.45 µmoles/g solution of $[Ph_3C][Al(HFPP)_4]$ in $CH_2Cl_2$ (5.2 µmoles) were added to the vial. While stirring, purified ethylene was then passed through the solution for eight minutes, and 0.141 g of polymer product was collected.

EXAMPLE 2

In this Example, 0.200 g of a 5.10 µmoles/g toluene solution of $Cp*_2ZrMe_2$ (1.02 µmoles) was added to a serum vial. Then, 19.3 g of toluene, 20.14 g of a 0.051 µmole/g solution of $[Ph_3C][Al(HFPP)_4]$ in toluene (1.03 µmoles), and 0.1 ml of a 25 wt % solution of TIBAL in heptane were added to the vial. Purified ethylene was then passed through the solution for six minutes, and 0.397 g of polymer product was collected.

EXAMPLE 3

In this Example, 2 mg of $[Ph_3C][Al(HFPP)_4]$ (1.6 µmoles) was added to a serum vial followed by 60 g of toluene, 0.178 g of a 9.3 µmoles/g toluene solution of $Cp*_2ZrMe_2$ (1.6 µmoles) and 0.1 ml of a 25 wt % solution of TIBAL in heptane. After passing purified ethylene through the solution for seven minutes, 0.532 g of polymer product was collected.

EXAMPLE 4

A catalyst solution was prepared by dissolving 1 mg of $[Ph_3C][Al(HFPP)_4]$ (0.80 µmole) in 20.8 g of toluene and adding 0.086 g of a 9.5 µmoles/g solution of $Cp*_2ZrMe_2$ in toluene (0.81 µmole). This solution was added to a separate flask containing 130 ml of hexane and 0.1 ml of a 25 wt % solution of TIBAL in heptane. Purified ethylene was then passed through the solution for twenty-eight minutes, and 0.619 g of polymer product was collected.

EXAMPLE 5

In this Example, 5 mg of [Ph$_3$C][Al(HFTB)$_4$] (5.0 μmoles) was added to a serum vial followed by 22.9 g of toluene, and 0.714 g of a 7.2 μmoles/g toluene solution of Cp*$_2$ZrMe$_2$ (5.1 μmoles). After passing purified ethylene through the solution for seven minutes, 0.111 g of polymer product was collected.

EXAMPLE 6

In this Example, 3 mg of [Ph$_3$C][Al(HFTB)$_4$] (3.0 μmoles) was added to a serum vial followed by 17.3 g of toluene, 0.266 g of a 11.4 μmoles/g toluene solution of Cp*$_2$ZrMe$_2$ (3.0 μmoles) and 0.1 ml of a 25 wt % solution of TIBAL in heptane. After passing purified ethylene through the solution for four minutes, 0.183 g of polymer product was collected.

EXAMPLE 7

A catalyst solution was prepared by dissolving 5 mg of [Ph$_3$C][Al(HFTB)$_4$] (5.0 μmoles) in 4.3 g of toluene and adding 0.536 g of a 9.5 μmoles/g solution of Cp*$_2$ZrMe$_2$ in toluene (5.1 μmole). This solution was added to a separate flask containing 70 ml of hexane and 0.1 ml of a 25 wt % solution of TIBAL in heptane. Purified ethylene was then passed through the solution for five minutes, and 0.366 g of polymer product was collected.

EXAMPLE 8

This Example illustrates, as do Examples 1 and 5, that a scavenger is not needed to obtain polymerization activity (activity is not due to interaction of metallocene with the scavenger).

In this Example, 6 mg of [Ph$_3$C][Al(HFPP)$_4$] (5 μmoles) was added to a serum vial followed by 34.6 g of toluene and 1.28 g of a 4.87 μmoles/g toluene solution of Cp*$_2$ZrMe$_2$ (6.3 μmoles). After passing purified ethylene through the solution for ten minutes, 0.838 g of polymer product was collected.

The foregoing Examples, since they merely illustrate certain embodiments of the present invention, should not be construed in a limiting sense. The scope of protection sought is set forth in the claims which follow.

We claim:

1. A catalyst composition for the polymerization of an olefin which comprises a neutral group 4 to 6 metal containing metallocene and an ionizing agent comprising an anionic aluminum-containing complex, wherein the anionic aluminum-containing complex comprises at least one group selected from the group consisting of a fluorinated alkoxy group, a fluorinated aryloxy group, and mixtures thereof bonded to the aluminum atom via their oxygen atoms.

2. A composition as claimed in claim 1 wherein the fluorinated alkoxy aluminate is of the formula A$^+$(Al (OR)$_4$)$^-$, where A$^+$ is a cation capable of reacting with the neutral metallocene to produce a cationic metallocene and a neutral species and R is at least one moiety selected from the group consisting of a fluorinated alkyl group, a fluorinated aryl group, and mixtures thereof.

3. A composition as claimed in claim 2 where A$^+$ is (C$_6$H$_5$)$_3$C$^+$.

4. A composition as claimed in claim 2 where A$^+$ is (C$_6$H$_5$)$_3$C$^+$ and (Al(OR)$_4$)$^-$ is [Al(OC(Ph)(CF$_3$)$_2$)$_4$]$^-$, where Ph is phenyl.

5. A composition as claimed in claim 2 where A$^+$ is (C$_6$H$_5$)$_3$C$^+$ and (Al(OR)$_4$)$^-$ is [Al(OC(CH$_3$)(CF$_3$)$_2$)$_4$].

* * * * *